Patented Feb. 13, 1951

2,541,190

UNITED STATES PATENT OFFICE 2,541,190

FLUORINATION OF LUBRICATING OIL

Anthony F. Benning, Woodstown, N. J., assignor to the United States of America as represented by the United States Atomic Energy Commission No Drawing. Application June 20, 1944,
Serial No. 541,300

2 Claims. (Cl. 260—653)

This invention relates to the manufacture of fluorocarbon compositions and is particularly concerned with a method for refining or finishing such compositions to improve their stability.

In the past it has been proposed to fluorinate hydrocarbons by several different methods, all involving a fluorination of the hydrocarbons in an extended physical state, either as vapors or as dilute liquids. For instance it has been proposed to pass lubricating oil vapors, diluted with an inert gas such as nitrogen or hydrogen fluoride, to maintain reactants and reaction products in vapor phase, into contact with a silver catalyst, and at the same time to introduce into the mixture elemental fluorine to effect the fluorination.

It has also been proposed to pass a mixture of vapors of a suitable high-boiling oil and a diluent into contact with a fluorinating agent such as silver difluoride, cobalt trifluoride, or manganese trifluoride. A somewhat similar result can be achieved by means of reduced pressure. Thus by maintaining a sufficient vacuum on the distillation and the reaction vessels, the materials employed can be maintained in the extended physical state required by the reaction.

In my patent application Serial Number 565,987, filed November 30, 1944, and entitled "Process for Fluorinating Hydrocarbons" a liquid phase fluorination process employing a high-boiling fluorocarbon diluent as a reaction medium is described. This application became U. S. Patent No. 2,521,626, on September 5, 1950.

In each of the fluorination processes outlined above, a product is obtained having 75% or more of the hydrogen initially present replaced by fluorine. However the products are not as stable as desirable for many purposes and act as reducing agents upon certain highly reactive materials and in some cases may contain highly toxic substances. While it has been proposed to refine such products by passage into contact with elemental fluorine in contact with a fluorination catalyst in a second pass, such an operation entails large losses of valuable high-boiling fluorocarbons.

It is an object of the present invention to stabilize fluorination products and to eliminate their reducing properties and remove toxic substances. A further object is to accomplish these purposes in a more economical manner and with less loss of high-boiling fluorocarbons than hitherto possible.

In accordance with the process of the present invention I subject fluorocarbon products of the type produced by any of the processes outlined above, to a finishing treatment in liquid phase with silver difluoride (AgF$_2$), cobalt trifluoride (CoF$_3$), or manganese trifluoride (MnF$_3$) employing the fluorinated product in a concentrated form.

The finishing treatment of my invention may be conducted at temperatures between 200° C. and 400° C. It can be carried out in any suitable equipment such as a closed iron or steel kettle or autoclave provided with an agitator, but it is preferred to employ equipment of more resistant materials of construction such as nickel or Monel metal.

The products of my process are highly stable high-boiling fluorocarbons, which are particularly resistant to active oxidizing agents and therefore are useful wherever a very stable high-boiling fluorocarbon product is required.

The invention is particularly applicable to the production of liquids of low vapor pressure suitable for use as lubricants, sealants, etc., where a high degree of stability, especially toward oxidizing agents, is essential or desirable.

The following examples will serve to illustrate the invhention:

Example 1

By the catalytic vapor phase fluorination of a lubricant oil fraction of petroleum by means of elemental fluorine diluted with nitrogen, and distillation from the product of oils boiling below 170° C. at one half atmosphere absolute pressure, 68 pounds of a crude high-boiling fluorocarbon residue were obtained, having an average molecular formula of about $C_{25}H_{10}F_{42}$. (If a product of this type is refined by a second treatment with elemental fluorine, about 10% or more is lost by degradation and the valuable 147° to 208° C. (at 10 mm. absolute pressure) fraction is correspondingly small, amounting to 20 pounds or less from 68 pounds of crude.) The 68 pounds of crude product were charged to a 6 gallon closed nickel kettle provided with a nickel agitator and with a temperature-controlled jacket. 7 pounds of CoF$_3$ were added, and the agitated mixture was heated gradually to 225° C. in a period of about 3 hours. Hydrogen fluoride formed during this period was bled from the kettle to avoid substantial pressure increase. Heating was continued at a temperature between 200° and 225° C. until the rate of evolution of hydrogen fluoride was less than 0.01 gram per hour.

The charge was then cooled to 150° C., and the solid inorganic products were allowed to settle. After the inorganic material had settled, a blow leg was inserted to within ½ inch of the precipitate, and pressure was applied to the vessel to blow the clear fluorocarbon into a steam-heated filter at a pressure of about 10 pounds per square inch above atmospheric. The filter comprised a ¼ inch layer of diatomaceous earth sandwiched between two layers of cloth. About 67 pounds of fluorocarbon product were obtained as filtrate.

The filtrate was fractionally distilled and a cut boiling between 147° C. at 10 mm. of mercury absolute pressure and 208° C. at the same pressure and amounting to about 24 pounds was collected as the final product. This product was a very stable non-toxic fluorocarbon product suitable for use as a fluorocarbon lubricant oil.

*Example 2*

225 pounds of a crude high-boiling fluorocarbon product, obtained by fluorinating a high-boiling lubricant oil fraction of petroleum by means of silver difluoride at temperatures of 150° to 240° C. in a high-boiling fluorocarbon solvent, separating the product by filtration to remove inorganic fluorides, and distilling off from the filtrate the solvent and other oils boiling below 140° C. at 10 mm. of mercury absolute pressure, are charged to a closed 50 gallon nickel kettle provided with an agitator and a jacket for temperature control. The agitator is started and 225 pounds of silver difluoride are charged while the kettle is maintained at a temperature between 80° C. and 90° C. After charging is completed, the kettle is closed except for a vent connected with a condenser for recovering evolved hydrogen fluoride. The kettle is then heated gradually to about 210° C. in 4 hours and held at this temperature for 15 minutes. It is then cooled to 100° C. and 225 pounds of silver difluoride are added. The temperature is raised gradually to 240° C. in about 4 hours, and the charge is maintained at this temperature for about 10 hours.

The kettle is cooled to 25–30° C., 283 pounds of trifluorotrichlorethane are added to increase the fluidity of the reaction mass, and the mixture is stirred for ½ hour. The charge is blown through a pressure filter as in Example 1 and the kettle is rinsed with additional trifluorotrichlorethane which is passed through the filter and is mixed with the total product until 600 pounds of the solvent have been used. The combined filtrate is passed to a still and fractionally distilled to separate the trifluorotrichlorethane as distillate. The distillation residue is then topped to 100° C. at 10 mm. of mercury absolute pressure.

The residue is returned to the 50 gallon kettle. 45 pounds of $CoF_3$ are added and the mixture is heated as before to a temperature of 275° C. in about 4 hours and held at this temperature for an additional 4 hours. It is then cooled to 80° C., an additional 45 pounds of $CoF_3$ are added, and the mixture is heated to a temperature of 275° C. for 4 hours and held at this temperature for 4 hours longer.

The product is next cooled to 100° C. and 22½ pounds each of $CoF_3$ and $AgF_2$ are added. The mixture is then heated to 275° C. in a period of 1 to 2 hours and held at this temperature for 4 hours. It is finally cooled, diluted with 83 pounds of trifluorotrichlorethane, stirred for ½ hour and blown through a filter as previously described. The kettle is again rinsed with an additional 317 pounds of trifluorotrichlorethane which is blown through the filter into the receiver with the fluorocarbon product. The trifluorotrichlorethane is distilled off and the product is distilled in vacuum, the oil distilling above 147° C. at 10 mm. of mercury being collected as the final product. It is a very stable high-boiling liquid, remarkably inert to oxidizing agents.

In order to insure a stable product, care should be taken to provide an ample quantity of the fluorinating agent. The product may be tested before the separation of inorganic material to determine whether the fluorination agent was completely used up or is present in substantial excess. If the former, additional reagent should be added and the process repeated.

It will be understood that I intend to include variations and modifications of the invention and that the preceding examples are illustrations only and in no wise to be construed as limitations upon the invention, the scope of which is defined in the appended claims, wherein

I claim:

1. The method for the further fluorination of a partially fluorinated product obtained by the fluorination of a hydrocarbon lubricating oil and having most of the hydrogen of the hydrocarbon replaced by fluorine, which comprises heating said product in undiluted form in liquid phase with $CoF_3$ at a temperature between 200° and 400° C.

2. The method for the further fluorination of a partially fluorinated hydrocarbon, obtained by the fluorination of a petroleum lubricating oil hydrocarbon and having at least 75% but not all of the hydrogen of the hydrocarbon replaced by fluorine, which comprises heating said product in undiluted form in liquid phase with an excess of $CoF_3$ at a temperature between 200° and 400° C. and continuing said heating until substantially no further reaction of said fluorinating agent with organic fluorinated product occurs.

ANTHONY F. BENNING.

REFERENCES CITED

The following references are of record in the file of this patent:

UNITED STATES PATENTS

| Number | Name | Date |
|---|---|---|
| 2,010,039 | Sharp | Aug. 6, 1934 |
| 2,062,743 | Daudt et al. | Dec. 1, 1936 |
| 2,090,772 | Wiezevich | Aug. 24, 1937 |
| 2,105,733 | Hass et al. | Jan. 18, 1938 |
| 2,129,289 | Soll | Sept. 6, 1938 |
| 2,186,916 | Wiezevich | Jan. 9, 1940 |
| 2,192,143 | Midgley et al. | Feb. 27, 1940 |
| 2,238,242 | Balon et al. | Apr. 15, 1941 |
| 2,307,773 | Egloff | Jan. 12, 1943 |
| 2,318,684 | Gaylor | May 11, 1943 |
| 2,423,045 | Passino et al. | June 24, 1947 |

FOREIGN PATENTS

| Number | Country | Date |
|---|---|---|
| 3,141 of 1931 | Australia | Jan. 26, 1933 |
| 429,591 | Great Britain | May 28, 1935 |
| 786,123 | France | June 3, 1935 |

OTHER REFERENCES

Ruff et al., "Angewandte Chemie," vol. 47, page 480 (1934).

Ruff et al., "Zeitschrift fur Anorg. & Allg. Chemie," vol. 219, pages 143–8 (1934).

Jockusch, "Naturwissenschaften," vol. 22, page 561 (1934).

McBee et al., "Industrial and Engineering Chem.," vol. 33, pages 176–181 (1941).

"Chemical Abstracts," vol. 26, page 1258 (1932). Abstract of article by Ruff et al.

Mellor, "Comprehensive Treatise on Inorganic and Theoretical Chemistry," vol. 12, page 344; vol. 14, pages 608–9.

Henne et al., J. A. C. S., vol. 63, page 3478 (1941).

Ruff and Keim, Z. fur Allg. Chem., vol. 201, pages 245–258 (1931).